United States Patent
Purdy et al.

(10) Patent No.: US 12,384,968 B2
(45) Date of Patent: Aug. 12, 2025

(54) INHIBITED HYDROFLUORIC ACID COMPOSITION

(71) Applicant: FLUID ENERGY GROUP LTD, Calgary (CA)

(72) Inventors: Clay Purdy, Medicine Hat (CA); Markus Weissenberger, Calgary (CA); Karl W. Dawson, Calgary (CA); Kyle G. Wynnyk, Calgary (CA)

(73) Assignee: DORF KETAL CHEMICALS FZE, Fujairah (AE)

( * ) Notice: Subject to any disclaimer, the term of this patent is extended or adjusted under 35 U.S.C. 154(b) by 0 days.

(21) Appl. No.: 17/981,968

(22) Filed: Nov. 7, 2022

(65) Prior Publication Data
US 2023/0082332 A1 Mar. 16, 2023

Related U.S. Application Data

(62) Division of application No. 16/839,631, filed on Apr. 3, 2020, now Pat. No. 11,518,936.

(30) Foreign Application Priority Data

Apr. 5, 2019 (CA) ..................... 3039288

(51) Int. Cl.
| | |
|---|---|
| C09K 13/08 | (2006.01) |
| C03C 15/00 | (2006.01) |
| C09K 8/528 | (2006.01) |
| C09K 8/72 | (2006.01) |
| C23F 1/16 | (2006.01) |

(52) U.S. Cl.
CPC .............. *C09K 13/08* (2013.01); *C03C 15/00* (2013.01); *C09K 8/528* (2013.01); *C09K 8/72* (2013.01); *C23F 1/16* (2013.01)

(58) Field of Classification Search
None
See application file for complete search history.

(56) References Cited

U.S. PATENT DOCUMENTS

| | | | |
|---|---|---|---|
| 3,413,326 A | 11/1968 | Schmid | |
| 3,936,316 A | 2/1976 | Galla | |
| 4,064,138 A | 12/1977 | Saari et al. | |
| 4,876,688 A * | 10/1989 | Wang | G02F 1/361 |
| | | | 252/589 |
| 8,389,453 B2 | 3/2013 | Thomson | |
| 10,035,949 B2 | 7/2018 | Gill et al. | |
| 2003/0227024 A1 | 12/2003 | Yoshii et al. | |
| 2018/0044042 A1* | 2/2018 | Jiang | E21B 43/27 |
| 2020/0158638 A1 | 5/2020 | Agrawal et al. | |
| 2020/0317516 A1 | 10/2020 | Purdy et al. | |
| 2020/0317996 A1 | 10/2020 | Purdy et al. | |

FOREIGN PATENT DOCUMENTS

WO 2016033259 A1 3/2016

\* cited by examiner

*Primary Examiner* — Allan W. Olsen
(74) *Attorney, Agent, or Firm* — Blank Rome LLP

(57) ABSTRACT

An inhibited hydrofluoric acid aqueous composition, said composition comprising: hydrofluoric acid in solution; and a weak base selected from the group consisting of: lysine, arginine, histidine, glutamine, asparagine, tryptophan, and tyrosine; wherein said weak base and hydrofluoric acid are present in a molar ratio of at least 1:1. Also disclosed is a mud acid using this inhibited acid composition.

5 Claims, No Drawings

INHIBITED HYDROFLUORIC ACID COMPOSITION

CROSS REFERENCE TO RELATED APPLICATION

This application is a divisional of U.S. Non-Provisional application Ser. No. 16/839,631 filed Apr. 3, 2020, which claims the benefit of Canadian Application No. 3,039,288 filed Apr. 5, 2019, the entire contents of which are incorporated herein by reference.

FIELD OF THE INVENTION

The present invention is directed to a novel acid composition for use in various industries, more specifically it is directed to an inhibited hydrofluoric acid (HF) and a mud acid using such.

BACKGROUND OF THE INVENTION

Acids have numerous applications across most industries. The use of acids requires certain safety precautions. All acids are not created equal, some are mundane and are found in almost every household, e.g., vinegar. Other acids are highly controlled to avoid major releases, which can cause serious environmental and human exposure consequences.

Hydrofluoric acid, while not a strong acid, i.e., does not dissociate fully in water, is classified as one of the most dangerous substances used in industry. Even small amounts of dermal exposure can result in organ failure and death.

Hydrofluoric acid is a solution of hydrogen fluoride (HF) and water. It is used in the preparation of almost all fluorine compounds, such as polymers. It is a highly corrosive colourless solution that is capable of dissolving a large number of materials, such as glass (silica) and various metals. Because it is highly reactive to glass and corrosive to various metals, it must be stored in plastic containment vessels or other non-reactive materials. As a gas (fumes), hydrogen fluoride is poisonous and can quickly and irreversibly damage soft tissues such as lungs and the corneas of the eyes. Aqueous hydrofluoric acid is a contact-poison with the potential for deep burns that, although initially painless, result in tissue death. By interfering with the body's calcium metabolism, the concentrated acid may also cause systemic toxicity and eventual cardiac arrest and fatality.

Its widespread use warrants the demand for a safer form of HF to allow handling, storage and transport thereof without the constant major negative risks associated with such, and desirably perhaps a loosening of the handling restrictions/requirements.

Prior art, while abundant in its use of HF for various applications, does not provide any indication of an effective, commercially viable, safe alternative for the handling of HF. One can immediately see the value of a safer to handle composition of HF given the multiple applications in multiple industries.

U.S. Pat. No. 8,389,453 teaches a tetrafluoroboric acid and an organic nitrogenous base, related compounds and compositions, can be used in conjunction with various methods of cleaning and/or the treatment of substrate surfaces. It specifically discloses a method for removing surface contaminants, said method comprising: providing an aqueous composition comprising a compound, said compound the acid-base reaction product of tetrafluoroboric acid and urea, said urea and said tetrafluoroboric acid in a molar ratio of about 1.0 to about 3.0, said urea utilized as a base and dissolved in said composition; and contacting said composition and a surface comprising at least one contaminant thereon.

WO2016033259A1 teaches methods for removing and inhibiting deposits, reducing the pH of aqueous mixtures, and increasing recovery of crude oil from subterranean formations, the methods comprising contacting an acid composition with a liquid that is in contact with a metal surface or with a well or formation. The composition comprises a salt of a nitrogen base having a fluoro-inorganic anion. In particular, these methods are intended for removing deposits and lowering the pH. These methods can be used in steam generators, evaporators, heat exchangers, and the like that use water compositions containing produced water and other water sources in plant unit operations.

U.S. Pat. No. 10,035,949 B2 teaches methods for increasing recovery of crude oil from a subterranean hydrocarbon-containing formation and for removing or inhibiting deposits in a well, the methods comprising contacting an acid composition that comprises a salt of a nitrogen base having a fluoro inorganic anion with the well or the formation.

Also known is tetrafluoroboric acid with the chemical formula $H_3OBF_4$. It is mainly produced as a precursor to fluoroborate salts. It is a strong acid and quite corrosive as it attacks the skin. It is available commercially as a solution in water and other solvents such as diethyl ether. In oil and gas applications it is considered to be a retarded acid which permits deep penetration into the reservoir before the acid is spent, i.e., fully reacted with the formation. For a solution of tetrafluoroboric acid, at no point in time is there a high amount of free HF, making it less reactive than common mud acids. Because of its long reaction time, tetrafluoroboric acid treatments require longer shut-in times compared to common mud acid or HF treatments making them less attractive due to operational restrictions.

In light of the prior art, there remains a need to produce a more HS&E oriented, technically advanced mud acid system and method of using such. The known uses have undeniable value in various industries but the health and environment risks and technically negative aspects associated with its use are many and considerable.

SUMMARY OF THE INVENTION

Accordingly, there is a provided a novel composition of inhibited HF which allows to overcome certain drawbacks from known HF compositions.

According to an aspect of the present invention, there is provided an inhibited hydrofluoric acid aqueous composition, said composition comprising:

hydrofluoric acid in solution; and a weak base selected from the group consisting of: lysine, arginine, histidine, glutamine, asparagine, tryptophan, and tyrosine;

wherein said weak base and hydrofluoric acid are present in a molar ratio of at least 1:1.

Preferably, there is provided an inhibited hydrofluoric acid aqueous composition, said composition comprising:

hydrofluoric acid in solution; and a weak base selected from the group consisting of: lysine, arginine, histidine, glutamine, asparagine, tryptophan, and tyrosine;

wherein said weak base and hydrofluoric acid are present in a molar ratio of at least 1.1:1.

Preferably, the weak base is lysine.

According to another aspect of the present invention, there is provided a method of preparing an inhibited hydrofluoric acid composition, said method comprising the steps of:
  providing a pre-determined amount of hydrofluoric acid;
  providing a weak base;
  adding the amino acid into the hydrofluoric acid until the molar ratio of weak base:hydrofluoric acid is at least 1.1:1.

According to another aspect of the present invention, there is provided a precursor to an acid composition for use in glass etching, said precursor comprising:
  hydrofluoric acid in solution; and
  a weak base;
wherein said weak base and hydrofluoric acid are present in a molar ratio of at least 1:1.

According to an aspect of the present invention, there is provided a method of using a precursor to an acid composition for glass etching, said precursor comprising:
  hydrofluoric acid in solution; and
  a weak base;
wherein said weak base and hydrofluoric acid are present in a molar ratio of at least 1:1; and
wherein the method comprises the steps of:
  providing a glass surface for etching;
  providing said precursor;
  exposing said precursor to an acid composition sufficient to dissociate an amount of HF required to etch glass;
  applying the precursor-acid composition to said glass surface for a sufficient time period to etch said glass surface.

Preferably, the acid composition is selected from the group consisting of acids having a pKa value of less than 3. Preferably, the acid having a pKa value of less than 3 is selected from the group consisting of: hydrochloric acid, nitric acid, sulfuric acid, modified acids, and organic acids. Preferably, the modified acid is selected from the group consisting of: HCl, MEA-HCl, urea-HCl, methanesulfonic acid, sulfuric acid, sulfamic acid, and lysine-HCl. Urea-HCl may come in various molar ratios of urea to HCl preferably, ratios below 1:1 are desirable. Ratios of 0.8:1 and less urea:HCl are more desirable, ratios of 0.7:1 and less are even more desirable. MEA-HCl may come in various ratios of MEA to HCl preferably, ratios ranging from 1:3 to 1:15 are desirable. Ratios ranging from 1:4 to 1:10 are more desirable. Ratios ranging from 1:5 to 1:9 are even more desirable. Lysine-HCl may come in various ratios of lysine to HCl preferably, molar ratios ranging from 1:3 to 1:15 are desirable. Ratios ranging from 1:4 to 1:10 are more desirable. Ratios ranging from 1:5.5 to 1:9 are even more desirable.

According to an aspect of the present invention, there is provided a mud acid composition comprising:
  an inhibited hydrofluoric acid aqueous composition, said composition comprising:
    hydrofluoric acid in solution; and
    a weak base; and
  an acid having a pKa value of less than 3;
wherein said weak base and hydrofluoric acid are present in a molar ratio of at least 1:1. Preferably, the acid with a pKa of less than 3 is selected from the group consisting of: selected from the group consisting of: HCl, MEA-HCl, urea-HCl, methanesulfonic acid, sulfuric acid, sulfamic acid, and lysine-HCl. Preferably also, said weak base and hydrofluoric acid are present in a molar ratio of at least 1.1:1.

According to a preferred embodiment of the present invention, the weak base is selected from the group consisting of: lysine, arginine, histidine, glutamine, asparagine, tryptophan, tyrosine. Preferably, the weak base is lysine.

According to another aspect of the present invention, there is provided a use of an acid composition in the oil industry to perform an activity selected from the group consisting of: stimulating formations; assisting in reducing breakdown pressures during downhole pumping operations; treating wellbore filter cake post drilling operations; treating scale on cyclical steam, oil sands or SAGD wells or related equipment; assisting in freeing stuck pipe; descaling pipelines and/or production wells; increasing injectivity of injection wells; lowering the pH of a fluid; fracturing wells; performing matrix stimulations; conducting annular and bullhead squeezes & soaks; pickling tubing, pipe and/or coiled tubing; increasing effective permeability of formations; reducing or removing wellbore damage; cleaning perforations; and solubilizing or stimulating sandstone formations.

According to another aspect of the present invention, there is provided a method of using a mud acid to acidize a sandstone formation, said method comprises the steps of:
  providing an inhibited hydrofluoric acid composition, comprising a pre-determined amount of hydrofluoric acid; and a pre-determined amount of a weak base; wherein the molar ratio of weak base:hydrofluoric acid is at least 1:1;
  providing an acid composition, said acid composition having a low pH and adapted to activate the inhibited hydrofluoric acid composition when put in contact therewith;
  combining the inhibited hydrofluoric acid composition with said acid composition to create a mud acid; and
  applying said mud acid to a silicate-containing formation and allowing said mud acid composition sufficient exposure time to dissolve a pre-determined amount of silica.

According to another aspect of the present invention, there is provided a method for removing silica or silicate deposits, said method comprising the steps of:
  providing an inhibited hydrofluoric acid composition, comprising a pre-determined amount of hydrofluoric acid; and a pre-determined amount of a weak base; wherein the molar ratio of weak base:hydrofluoric acid is at least 1:1;
  providing an acid composition, said acid composition having a low pH and adapted to activate the inhibited hydrofluoric acid composition when put in contact therewith; and
  combining the inhibited hydrofluoric acid composition with said acid composition to create a mud acid.

According to another aspect of the present invention, there is provided a method for removing silica or silicate deposits on a metal surface, said method comprising the steps of:
  providing an inhibited hydrofluoric acid composition, comprising a pre-determined amount of hydrofluoric acid; and a pre-determined amount of an weak base; wherein the molar ratio of weak base:hydrofluoric acid is at least 1:1;
  providing an acid composition, said acid composition comprising a corrosion inhibitor package and having a low pH and adapted to activate the inhibited hydrofluoric acid composition when put in contact therewith; and combining the inhibited hydrofluoric acid composition with said acid composition to create a mud acid.

Preferably, said weak base and hydrofluoric acid are present in a molar ratio of at least 1.1:1.

Preferably, the corrosion inhibitor package comprises: a metal iodide such as potassium iodide; a terpene; optionally, a cinnamaldehyde or a derivative thereof; at least one amphoteric surfactant; a solvent; and optionally, a non-emulsifier.

Preferably, the addition of the inhibited hydrofluoric acid composition is done by injecting it directly into the flowing acid composition. According to a preferred embodiment, the addition of the inhibited hydrofluoric acid composition is done by injecting it directly into the flowing acid composition by a venturi entrainment of the inhibited hydrofluoric acid by the acid composition.

According to a preferred embodiment of the present invention, the weak base used in the method is selected from the group consisting of: lysine, arginine, histidine, glutamine, asparagine, tryptophan, tyrosine. Preferably, the weak base is lysine.

DESCRIPTION OF EMBODIMENTS OF THE PRESENT INVENTION

Example 1—Inhibited HF Composition

According to a preferred embodiment of the present invention, inhibited HF can be made by the addition of at least 1 molar equivalent of an amino acid, such as lysine. The subsequent addition of an acid to the inhibited HF composition restores the inhibited HF's ability to dissolve sand, and it has a similar dissolving power when compared to a regular mud acid.

HF was inhibited by the addition of an amino acid such as lysine, until very little (i.e. an insignificant amount) quartz ($SiO_2$) was observed to be dissolved. A molar ratio of 1:1 weak base to HF or greater was found to be necessary to inhibit HF's ability to dissolve quartz, and a ratio of 1.1:1 was used during testing to provide a reasonable safety margin. It is assumed that at a ratio of 1.1:1, the hazard for skin contact of the solution has largely been eliminated.

Preferably, an inhibited acid should be effective at dissolving metal oxides (especially aluminum oxide) as well as complex silicates. Other desirable properties include: the ability to rapidly solubilize iron oxides and ability to dissolve calcium based scales.

Re-Activation of the Inhibited HF Composition

The inhibited HF solution can regain its quartz dissolving potential through the addition of an acidic solution, such as HCl. By themselves, HCl or inhibited HF dissolve essentially no quartz; however, in combination they perform on par with a normal mud acid (HF:HCl).

To evaluate the performance of mud acids created with acid compositions comprising HCl:MEA in molar ratios of 4.4:1; 6.3:1; and 11.3:1, inhibited HF mud acids were prepared using HCl and acid compositions comprising HCl:MEA in ratios of 4.4:1; and 11.3:1 with various amount of free HCl (6 to 12%). The results show that mud acids produced with acid compositions comprising HCl:MEA in ratios of 4.4:1; and 11.3:1 match, and may even exceed, the performance of a standard HCl mud acid.

According to a preferred embodiment of the present invention, the mud acid is first made by preparing an inhibited HF. The inhibited HF can be made by the addition of at least 1 molar equivalent of a weak base having a pKa greater than 7. Compounds which fit these criteria are selected from the group consisting of: lysine, arginine, histidine, glutamine, asparagine, tryptophan, and tyrosine. Preferably, a safety factor of 10% is used, so 1.1 molar equivalents of weak base are added to 1 mole of HF. The subsequent addition of an acid to the inhibited HF composition restores the inhibited HF's ability to dissolve sand, and it has a similar dissolving power to a regular mud acid.

Effects of Mud Acid Compositions Comprising HCl:MEA in Ratios of 4.4:1; 6.3:1; and 11.3:1 on Reprecipitation Three types of reprecipitation products are commonly known to occur during sandstone acidizing, and are referred to as primary, secondary, and tertiary reaction products.

Primary precipitation products can occur between HF and calcium (from $CaCO_3$) to produce calcium fluoride as per equation (1):

$$2\,HF_{(aq)} + CaCO_{3(s)} \rightarrow CaF_{2(s)} + CO_{2(g)} + H_2O_{(l)} \qquad (1)$$

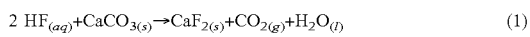

The precipitation will occur when the concentration of $CaF_2$ exceeds 0.16 g/L. This reaction is avoided by using an acidic pre-flush to clean the near-wellbore region, and the inhibited HF combined with HCl for example, will not prevent this reaction if calcium is present.

Secondary precipitation products are those that occur as a result of a reaction with hexafluorosilicic acid ($H_2SiF_6$), which is produced when HF reacts with quartz as shown in equation 2, or with clay (general formula of Al—Si) as shown in equation 4:

$$6HF(aq) + SiO_2(s) \rightarrow H_2SiF_6(aq) + 2H_2O(l) \qquad (2)$$

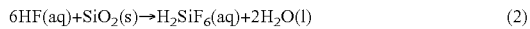

$$(6+x)HF(aq) + Al\text{-}Si(s) \rightarrow H_2SiF_6(aq) + AlF_x^{(3-x)+}(aq) \qquad (3)$$

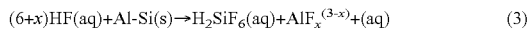

Hexafluorosilicic acid can react with alkali metals ($M^+$), typically sodium or potassium, to produce hexafluorosilicate precipitates as per equation 4:

$$H_2SiF_6(aq) + 2M^+(aq) \rightarrow M_2SiF_6(s) + 2H^+(aq) \qquad (4)$$

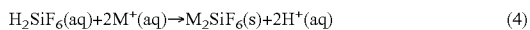

The precipitation will occur when the concentration exceeds 6.4 g/L for $Na_2SiF_6$, and 1.8 g/L for $K_2SiF_6$. Fluid's inhibited mud acid was not expected to prevent this precipitation, and laboratory trials demonstrate that similar amounts of potassium hexafluorosilicate were precipitated in comparison to a standard mud acid.

Hexafluorosilicic acid can also react with the aluminum in clays to produce a silica gel precipitate as shown in equation 5 (unbalanced):

$$H_2SiF_6(aq) + Al^{3+}(s) \rightarrow AlF_x^{(3-x)+}(aq) + SiO_2(s) + H^+(aq) \qquad (5)$$

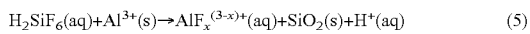

This reaction is reported to occur slowly at temperatures below 50° C., but rapidly at higher temperatures. When dissolving Kaolinite clay ($Al_2Si_2O_5[OH]_4$), laboratory tests found no difference in the amount of dissolved material when comparing a standard mud acid to an inhibited mud acid made with an acid composition comprising HCl:MEA in a ratio of 11.3:1, demonstrating that this preferred composition according to the present invention is as effective as current systems while providing storage, environmental and handling advantages.

The aluminum fluoride produced in equation 5 (also equation 3) can also precipitate above pH 2.5-3 if there is a high F/Al ratio, but the solubility of $AlF_3$ is relatively high at 56 g/L.

Tertiary precipitation products are those that occur as a result of a reaction of the aluminum fluorides produced in equations 3 and 5 continuing to react with clays to produce a silica gel precipitate as shown in equation 6 (unbalanced):

$$yAlF_x^{(3-x)+}(aq) + (x-y)Al\text{---}Si(s) + H^+(aq) \rightarrow xAlF_x^{(3-x)+}(aq) + (x-y)SiO_2(s) \qquad (6)$$

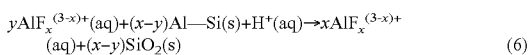

This tertiary reaction only occurs slowly at temperatures below 95° C., and is understood to produces essentially the same precipitates as the secondary reaction products in equation 5. Similar results to those obtained are expected, providing a linear performance between a standard mud acid and an inhibited HF mud acid.

Mud Acid Ratio Limitations Using Acid Composition of HCl:MEA in Ratios of 4.4:1; 6.3:1; and 11.3:1 and Inhibited HF Mud acids typically contain HF at concentrations of 0.5 to 3% by mass, and HCl at 4 to 15% by mass. By using acids with an enhanced HSE profile, such as HCl:MEA (in a ratio of 4.4:1), rather than 15% HCl, the additional MEA inhibitor will limit the amount of free HCl available in solution. The maximum amount of free HCl that would be available for mud acids made using inhibited HF and acid compositions comprising HCl:MEA in molar ratios of 4.4:1; 6.3:1; and 11.3:1.

According to another embodiment of the present invention, a few common high HCl:HF ratios, such as 12:3 and 10:2, are not possible using HCl:MEA (in a ratio of 4.4:1) and the inhibited HF according to a preferred embodiment of the present invention; to achieve these higher strength mud acids, HCl:MEA blends with lower HSE performance (where the HCl:MEA molar ratios are 6.3:1; and 11.3:1, for example) may be required.

Safe hydrofluoric acid (HF) compositions, those that do dissolve very small amounts of silica ($SiO_2$), were tested using amino acids as weak base inhibitors to determine which molecular features were important. It was determined that an amino acid with no free basic sites such as glycine, where the amino group is protonated by the carboxylic acid, does not inhibit HF. By contrast, lysine, where only one of the amino groups is protonated by the carboxylic acid moiety, retains a free weakly basic site (pKa greater than 7) and does inhibit HF when it is added at a 1 molar equivalent (or greater) relative to HF. Weak bases having a pKa greater than 7 which would meet these criteria include amino acids such as: lysine, arginine, histidine, glutamine, asparagine, tryptophan, tyrosine.

Testing of Weak Base Inhibitors
Procedure:

Weak base inhibited HF formulations (A to C) were prepared by mixing the inhibitor and HF in the concentrations listed, and adding water until a clear solution was obtained, and are shown in Table 1.

TABLE 1

Weak Base Inhibited HF Test Solutions

| Solution | Inhibitor | Inhibitor:HF Molar Ratio | Final Solution HF Concentration (% w/w) |
|---|---|---|---|
| A | Glycine | 1.10:1 | 9.3% |
| B | Lysine | 0.55:1 | 7.9% |
| C | Lysine | 1.10:1 | 5.2% |
| D | Monoethanolamine | 1.10:1 | 18.5% |
| E | None | 0.00:1 | 49.3% |

In addition, tests were done with an inhibited HF solution where the inhibitor is monoethanolamine (MEA) at 1.10 molar equivalents (solution D), and HF with no inhibitor (solution E) as comparisons. An aliquot of each solution was diluted with water to create 100 g of solution at 3% HF. These solutions were heated to 75° C., and 5 grams of silica was added to each solution, and allowed to stir for 4 hours. The solutions were filtered to recover the undissolved silica, which was washed with water, dried in an oven, and then weighed to determine the amount of silica dissolved by each solution. The amount of silica dissolved by each solution is shown in Table 2.

TABLE 2

Silica Dissolution Testing

| Solution | Inhibitor | Inhibitor:HF Molar Ratio | Dissolved Silica (mg) |
|---|---|---|---|
| A | Glycine | 1.10:1 | 442 |
| B | Lysine | 0.55:1 | 223 |
| C | Lysine | 1.10:1 | 21 |
| D | MEA | 1.10:1 | 3 |
| E | None | 0.00:1 | 245 |

Solution E, uninhibited HF, provides a baseline silica dissolution of 245 mg. An inhibited HF mixture should dissolve significantly less material, as exhibited by methanolamine (MEA) (solution D) which dissolved only 3 mg. The glycine-inhibited solution (A), increases the amount of dissolved silica, likely due to the slightly acidic nature of glycine. Adding 0.55 molar equivalents of lysine (solution B) provides an insufficient inhibition of HF to render it substantially safe for handling despite showing some inhibitory effect. Increasing to 1.1 molar equivalents shows significant inhibition (solution C).

These results show that the amino acids are in their zwitterionic forms, and that glycine's only amino group is unavailable to inhibit HF. Lysine, on the other hand, has two amino groups, thus one group is always free to interact with HF. At 0.55 molar equivalents, there is still free HF, so silica is dissolved, but at 1.1 molar equivalents, the HF is significantly inhibited.

Based on these observations, it can be concluded that amino acids with more than one basic site can act as HF inhibitors, as well as other weak amine bases, having a pKa greater than 7.

According to a preferred embodiment of the present invention, the composition can be used in oil refining (as an acid catalyst in a standard oil refinery process). According to another preferred embodiment of the present invention, the composition can be used in the production of organofluorine compounds including: Teflon®, fluorocarbons, fluoropolymers and refrigerants like freon. According to yet another preferred embodiment of the present invention, the composition can be used in the production of fluoride compounds such as cryolite, aluminium trifluoride, to name but a few examples. According to another preferred embodiment of the present invention, the composition can be used as a pickling and cleaning agent in metalworking. It has a great ability to remove oxides and other impurities from carbon steels and stainless steel. According to yet another preferred embodiment of the present invention, the composition can be used, upon dilution and/or activation, as a household or industrial rust stain remover or aluminum or other appropriate metal brightener. According to yet another preferred embodiment of the present invention, the composition can be used, upon activation by another acid, for glass etching.

In the oil and gas industry, according to a preferred embodiment of the present invention, the inhibited hydrofluoric acid aqueous composition, said composition comprising:
    hydrofluoric acid in solution; and
    an amino acid; and can be mixed with an acid to initiate activation, this can be done in-situ or closed-loop—down-hole in most cases, thus eliminating the risk of human or environmental exposure, thus minimizing or virtually eliminating the risk of exposure to the activated material, greatly improving safety and handling of the material compared to the current unmodified systems utilized in industry, which have proven fatal in the past to workers. Preferably, the addition of the inhibited or modified hydrofluoric acid aqueous composition is done directly into the wellbore or closed-looped system in the case of non-oil & gas industrial applications and, more preferably, said composition is essentially aspirated into the system through a venturi effect by the acid composition being injected whose purpose is to activate the inhibited hydrofluoric acid aqueous composition.

While the foregoing invention has been described in some detail for purposes of clarity and understanding, it will be appreciated by those skilled in the relevant arts, once they have been made familiar with this disclosure that various changes in form and detail can be made without departing from the true scope of the invention in the appended claims.

The invention claimed is:

1. A method of preparing an inhibited hydrofluoric acid composition, said method consisting of:
   providing a pre-determined amount of hydrofluoric acid;
   providing a weak base selected from the group consisting of glutamine, asparagine, tryptophan and tyrosine;
   adding the weak base into the hydrofluoric acid until the molar ratio of weak base:hydrofluoric acid is at least 1.1:1.

2. The method of claim 1, wherein the weak base is glutamine.

3. The method of claim 1, wherein the weak base is asparagine.

4. The method of claim 1, wherein the weak base is tryptophan.

5. The method of claim 1, wherein the weak base is tyrosine.

* * * * *